Patented June 3, 1952

2,599,512

UNITED STATES PATENT OFFICE 2,599,512

O-2,4,6-TRICHLOROPHENYL O,O-DIALKYL-THIOPHOSPHATES

Lewis R. Drake, Midland, and Arthur J. Erbel, Bay City, Mich., assignors to The Dow Chemical Company, Midland, Mich., a corporation of Delaware No Drawing. Application April 21, 1950, Serial No. 157,411

3 Claims. (Cl. 260—461)

This invention is directed to the O-2,4,6-trichlorophenyl O,O-dialkylthiophosphates having the formula

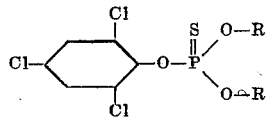

wherein R represents a methyl or ethyl radical. These new compounds are crystalline solids, somewhat soluble in many organic solvents, and substantially insoluble in water. They are of value as toxic constituents of parasiticide compositions.

The new compounds may be prepared by reacting O-2,4,6-trichlorophenyl dichlorothiophosphate of the formula

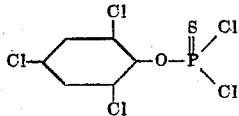

with methanol or ethanol.

In carrying out the reaction, about 20 molecular proportions of methanol or ethanol and at least 2 molecular proportions of pyridine are dissolved in benzene, methylene dichloride, diethyl ether, or other suitable solvent, and the resulting solution added portionwise to 1 molecular proportion of O-2,4,6-trichlorophenyl dichlorothiophosphate dissolved in the same solvent. The addition is carried out with stirring and at a temperature of from 20° to 45° C. Upon completion of the reaction, the crude reaction mixture may be washed with water and dried. The separation of the desired product is then accomplished by evaporation of the solvent.

O-2,4,6-trichlorophenyl dichlorothiophosphate employed as a starting material, as above described, may be prepared by reacting 2,4,6-trichlorophenol with thiophosphoryl chloride (PSCl₃) in a molecular excess of pyridine. In carrying out the reaction, 1 molecular proportion of 2,4,6-trichlorophenol is dissolved in at least 1 molecular proportion of pyridine and the resulting solution added portionwise to 5 molecular proportions of thiophosphoryl chloride. The addition is carried out with stirring and at a temperature of from 25° to 100° C. In practice, it is sometimes convenient to operate at the boiling temperature of the reaction mixture and under reflux. A mixture of pyridine and an inert solvent such as methylene dichloride may be substituted for the excess pyridine, provided only that at least 1 molecular proportion of pyridine be present for each molecular proportion of 2,4,6-trichlorophenol present in the mixture. Upon completion of the reaction, the crude mixture is fractionally distilled under reduced pressure to obtain the O-2,4,6-trichlorophenyl dichlorothiophosphate as a crystalline solid melting at 47° to 50° C.

The following examples illustrate the invention but are not to be construed as limiting:

*Example 1.—O-2,4,6-trichlorophenyl O,O-dimethylthiophosphate*

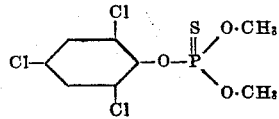

32 grams (1 mole) of methanol and 7.9 grams (0.1 mole) of pyridine was dissolved in 50 milliliters of petroleum ether (boiling at 60–70° C.) and the resulting solution added portionwise with stirring to 16.5 grams (0.05 mole) of 2,4,6-trichlorophenyl dichlorothiophosphate dissolved in 50 milliliters of petroleum ether. The addition was carried out over a period of ½ hour and at a temperature of from 20–35° C. The reaction vessel and content was cooled to room temperature, and the crude mixture washed with water and dried with anhydrous calcium chloride. The solvent was then removed by evaporation to obtain O-2,4,6-trichlorophenyl O,O-dimethyl thiophosphate as a crystalline solid melting at 59–60° C.

*Example 2.—O-2,4,6-trichlorophenyl O,O-diethylthiophosphate*

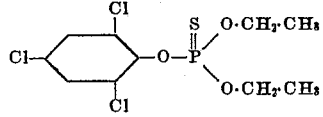

46 grams (1 mole) of ethanol and 7.9 grams (0.1 mole) of pyridine were dispersed in 50 milliliters of petroleum ether and the resulting solution added portionwise to 16.5 grams (0.05 mole) of 2,4,6-trichlorophenyl dichlorothiophosphate dissolved in 50 milliliters of petroleum ether. The addition was carried out over a period of ½ hour and at a temperature of from 20–35° C. The reaction vessel and content were then cooled to room temperature, and the crude product thereafter washed with water and dried with anhydrous calcium chloride. The solvent was then removed by evaporation to obtain O-2,4,6-trichlorophenyl O,O-diethylthiophosphate as a crystalline solid melting at 49–51° C.

The new thiophosphates have been found effective as parasiticides and are adapted to be employed for the control of a wide range of agricultural and household pests. For such use the products may be dispersed on a finely divided solid or employed as dusts. Also, such mixtures may be dispersed in water with the aid of a wetting agent and the resulting aqueous suspensions employed as sprays. In other procedures, the products may be employed in oils, as constituents of oil-in-water emulsions, or in water dispersions with or without the addition of dispersing or emulsifying agents.

We claim:

1. An O-2,4,6-trichlorophenyl O,O-dialkylthiophosphate having the formula

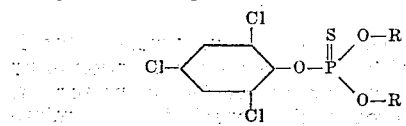

wherein R represents a member of the group consisting of the methyl and ethyl radicals.

2. O-2,4,6-trichlorophenyl O,O-dimethylthiophosphate.

3. O-2,4,6-trichlorophenyl O,O-diethylthiophosphate.

LEWIS R. DRAKE.
ARTHUR J. ERBEL.

REFERENCES CITED

The following references are of record in the file of this patent:

UNITED STATES PATENTS

| Number    | Name     | Date          |
|-----------|----------|---------------|
| 2,520,393 | Fletcher | Aug. 29, 1950 |

FOREIGN PATENTS

| Number  | Country       | Date          |
|---------|---------------|---------------|
| 326,137 | Great Britain | Feb. 28, 1930 |